United States Patent [19]

Rowen

[11] 3,729,928

[45] May 1, 1973

[54] TORQUE CONTROL SYSTEM FOR A GAS TURBINE

[75] Inventor: William I. Rowen, Schenectady, N.Y.

[73] Assignee: General Electric Company, Schenectady, N.Y.

[22] Filed: Mar. 26, 1971

[21] Appl. No.: 128,399

[52] U.S. Cl. ............... 60/39.28 P, 416/30, 60/39.17
[51] Int. Cl. ................................................ F02c 9/08
[58] Field of Search ................. 60/39, 28 R, 39.28 P, 60/39.16 R, 17; 415/17

[56] References Cited

UNITED STATES PATENTS

| | | | |
|---|---|---|---|
| 3,606,754 | 9/1971 | White | 60/39.14 X |
| 3,421,317 | 1/1969 | Bedford | 60/39.28 R |
| 3,520,133 | 7/1970 | Loft et al. | 60/39.28 R |
| 3,106,062 | 10/1963 | Rosenberg et al. | 60/39.28 R |
| 3,255,586 | 6/1966 | Hennig et al. | 60/39.28 R |

Primary Examiner—Carlton R. Croyle
Assistant Examiner—Robert E. Garrett
Attorney—William C. Crutcher, James W. Mitchell, Frank L. Neuhauser, Oscar B. Waddell and Joseph B. Forman

[57] ABSTRACT

A gas turbine control system has a plurality of closed loop controls, each depending on a different operating parameter and providing a fuel control signal in accordance therewith. A predetermined linear relationship exists among the power output and the output shaft speed at the upper limit of acceptable output torque which is developed. A comparator is employed to compare the predetermined power setting signal applied to the gas turbine and a signal representative of the output shaft speed. Through this comparison it is possible to limit the output torque developed in the transmission components to an acceptable maximum value.

2 Claims, 2 Drawing Figures

INVENTOR
WILLIAM I. ROWEN

TORQUE CONTROL SYSTEM FOR A GAS TURBINE

BACKGROUND OF THE INVENTION

The present invention relates generally to an improved control system for a gas turbine power plant and more particularly to one that is adapted for use on marine gas turbines.

Controlling the various parameters in a large gas turbine has become quite complex, but as a result of the increasing complexity, the output characteristics have been enhanced together with an increased lifetime for many of the component parts. Such controls normally incorporate means to influence the rate of fuel flow to the gas turbine combustion chamber in accordance with fuel control signals obtained by monitoring the operating parameters of the gas turbine. Examples of such control systems are known in the art and may be found in U.S. Pat. No. 3,520,133 issued July 14, 1970, to A. Loft et al. for a "Gas Turbine Control System" and U.S. Pat. No. 3,639,076, issued to W.I. Rowen on Feb. 1, 1972, for a "Constant Power Control System for a Gas Turbine," both assigned to the assignee of the present invention.

The subject matter of the present invention is directed to an improved torque limiting feature incorporated into a power control loop. Prior to the subject invention, a predetermined power setting was applied to a power control loop for a turbine to condition the apparatus for a specified fuel flow or power output. The predetermined power setting was dependent, however, on the other operating parameters of the turbine which parameters could be calling for a fuel flow below that commensurate with the predetermined power setting. When the predetermined power setting was not limited, however, by one of the other operating parameters, there would be a call for a fuel flow commensurate with that of the predetermined power setting. The output of the power control loop would then be compared to the actual fuel flow through a representative feedback signal.

The subject invention is concerned with a method of limiting an applied predetermined power setting when the output shaft is subjected to constant propeller pitch operation and conditions which cause a reduction in output shaft speed. If for some reason, the output shaft should be overloaded, the induced torque would necessarily increase at any operating predetermined power setting. Further, the subject invention is concerned with similarly limiting an increased power setting which has been applied to the gas turbine, resulting in increased power to the output shaft. If, because of load on the propeller for example, the speed of the output shaft does not increase as fast as the increase in power, overtorquing can occur.

In the present embodiment, three modes of operation of the gas turbine power plant are envisioned. In the first, a minimum power setting is supplied to the power control loop and is independent of a propulsion lever position. In this arrangement the ship's speed is varied by a zero to full setting on the propulsion lever position effecting, through a first pitch control, a corresponding zero to full propeller pitch status on the gas turbine output shaft.

In the second mode of operation, the propulsion lever position effects an input to a first pitch control loop, utilized in the first mode of operation, and also effects a predetermined power setting input into the power control loop which is added to an already existing minimum power setting. In this mode, full propeller pitch is achieved in approximately the first 25 percent travel of the propulsion lever while the vessel speed response is designed to linearly increase throughout the entire propulsion lever range.

In a third mode of operation, a desired power setting, indicated by the propulsion lever position, induces a corresponding fuel flow to the combustion chambers of the gas turbine. In this arrangement a second pitch control loop is utilized while the first pitch control is inoperative. An output shaft speed signal is utilized as an input to the second pitch control. In this mode it is desired to maintain the output shaft speed constant for a predetermined power setting by varying pitch accordingly. Therefore, the output shaft speed signal indicates to the second pitch control any variation in the speed of the output shaft.

Accordingly, it is an object of the present invention to limit the amount of torque which can be induced the second and third modes of operation when the ship is subjected to conditions causing either a decrease in the output shaft speed or an increase in the power setting.

SUMMARY OF THE INVENTION

Simply stated, the invention is practiced in two modes of operation by comparing the predetermined power setting signal applied to the gas turbine and a signal proportional to the speed of the output shaft. A gating device used for this comparison, passing the lower of the two signals, thereby limits the amount of torque which can be induced in the transmission components of the system. A predetermined linear relationship exists between the power output and the output shaft speed at the upper limit of acceptable output torque.

DESCRIPTION OF THE DRAWINGS

The subject matter which is regarded as the invention is particularly pointed out and distinctly claimed in the concluding portion of the specification. The invention, however, both as to organization and method of practice, may best be understood by reference to the following description, taken in connection with the accompanying drawings, in which:

DESCRIPTION OF THE INVENTION

Figure 1:
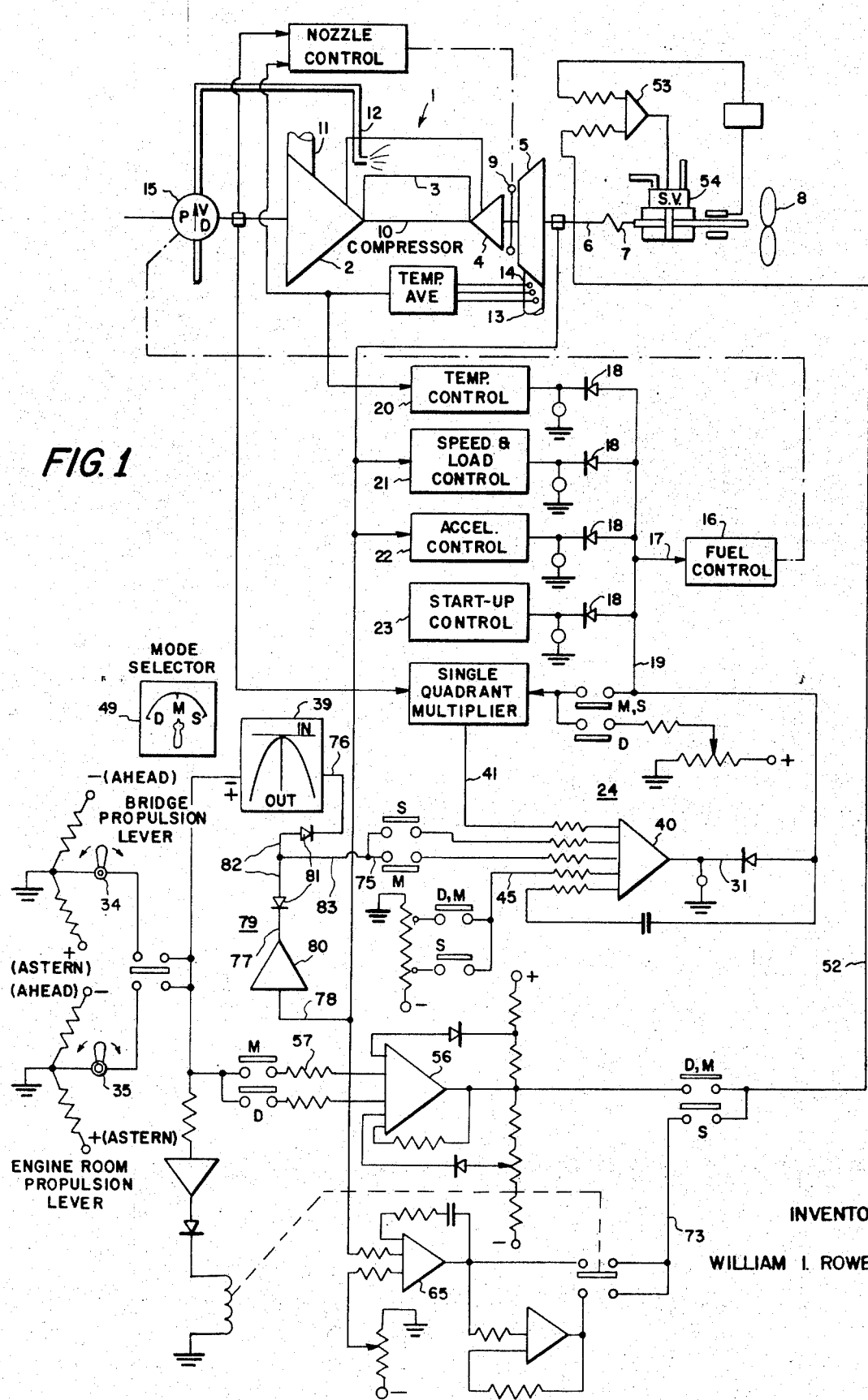
FIG. 1 is a simplified schematic diagram of a D.C. analog control applicable to a gas turbine for carrying out the object of the invention.

Referring to FIG. 1 of the drawing, a simplified representation of a two-shaft gas turbine, indicated generally as 1, includes a compressor 2, combustion chamber 3, high pressure turbine 4, and low pressure turbine 5. It is known in the art that in certain gas turbine applications, it is desirable to have the high pressure turbine 4 which drives the compressor 2, and the load turbine 5 mounted on separate shafts. In the application shown in FIG. 1, a load turbine shaft 6 is connected through a set of reduction gears, symbolically shown at 7, to a propeller 8. Propeller 8 is of the controllable reversible pitch variety, the function of which will be more fully described later.

A variable area second stage nozzle 9 aerodynamically couples the high pressure turbine 4 with the load turbine 5. The details of this nozzle are not material to the present invention and such nozzles are well known in the art; an example of a suitable nozzle with its attending control system is shown in U.S. Pat. No. 2,625,789, issued on Jan. 20, 1953 to N.E. Starkey and assigned to the assignee of the present invention.

Air entering the compressor inlet at 11 supports the combustion of fuel injected by a nozzle 12 in the combustion chamber 3. The heated exhaust gases, after passing through the high pressure turbine 4 and low pressure turbine 5, exit from the turbine outlet 13 past distributed temperature sensors, such as 14 for measuring exhaust temperature. A variable delivery fuel pump 15 is driven from a compressor high pressure turbine shaft 10 and delivers fuel to nozzle 12 at a rate of flow which depends both upon rotational shaft speed of shaft 10 and the pump stroke which is set by a fuel control servo 16. The details of fuel control servo 16 are not material to the present invention and it may include any servo mechanism which positions the stroke setting control on the pump at a position corresponding to an electrical positioning signal, there being many devices on the market suitable for such use. Further, since the gas turbine may utilize gaseous fuel, in which case a gas valve system would control fuel flow to the combustion chamber, the term "fuel control signal" is used to designate the signal regardless of the type of fuel used.

The fuel control signal is a single valued electrical signal which appears on line 17 and is applied to fuel control 16 by a low value gate comprised of a plurality of diodes 18. Diodes 18 are poled as shown with respect to a common bus 19, from which the fuel control signal is obtained on line 17. As is explained in U.S. Pat. No. 3,520,133 - Loft et al., this arrangement monitors a series of individual fuel control signals emanating from separate closed loop controls which are respective to respective operating parameters of the gas turbine. The lowest of these fuel control signals is passed on line 17 and subsequently determines the fuel flow to the combustion chamber of the gas turbine.

A plurality of loop control means 20, 21, 22 and 23 are employed. The control 20 operates in response to an average temperature input related to the turbine exhaust gas area. The control 21 operates as a speed and load monitor while controls 22 and 23 respectively monitor acceleration and start-up conditions of the gas turbine. The particular details of the loop control means 20, 21, 22 and 23 are not necessary for the description of the present invention. The operation of such loop control means is described in the aforesaid Loft et al. patent.

To produce an additional fuel control signal, which appears on line 31, an additional loop control means 24 is provided. The additional loop control means 24 is responsive to a power set point and a feedback signal representative of actual fuel flow.

Generally the ship incorporating the turbine referred to herein is subject to three modes of operation, namely Docking, Maneuvering and Sea Modes as selected by mode selector 49. The three modes are indicated by the symbols D,M and S respectively in FIG. 1. In all three modes 100 percent travel of the propulsion levers 34 and 35 is permitted. Either lever may be utilized to control the vessel's power plant from either the bridge or engine room areas respectively.

In the Docking (D) mode the subject invention does not apply. As fully described in the aforesaid Rowen application, a predetermined minimum power signal is fed into the power control amplifier 40 through the line 45. A feedback signal representative of the actual compressor speed, multiplied by a compensating gain, is also fed into the power control amplifier 40 through line 41. Thus, the additional loop control means is converted to a simple governor for the high pressure turbine and compressor. During this mode of operation, with the power in the gas turbine being fixed at a minimum level, the ship speed is controlled by varying the propeller pitch through a first pitch control generally indicated as operational amplifier 56. As the propulsion lever is advanced, an input to operational amplifier 56 is supplied. Operational amplifier 56 produces an input to operational amplifier 53 through line 52 which in turn controls the propeller pitch through a servo mechanism 54. In this manner, a zero to full propeller pitch corresponds to a zero to full travel position of the propulsion lever thereby effecting a sensitive control of the ship's speed as would be necessary for a docking situation. Further, in the absence of any signal through operational amplifier 56 and line 52, zero pitch is called for on the ship's propeller.

The control system of the subject invention is of importance in the Maneuvering (M) mode. When the propulsion lever has not been advanced, a predetermined minimum power signal is fed into the power control amplifier 40 through line 45 in the same manner as in the Docking mode. As the propulsion lever is advanced a predetermined power setting is applied to a cubic function generator 39. The function generator 39 provides a first signal representative of the predetermined power setting to the gas turbine. The function generator 39 provides the first signal in a manner such that the ship's actual speed will linearly increase with the advancement of the propulsion lever. This results from the fact that the ship's speed is proportional to the cube of the ship's power. Therefore, as the propulsion lever is advanced calling for a corresponding linear increase in the speed of the ship, the first signal calls for the power necessary to drive the ship at the desired speed as indicated by the propulsion lever position. Further, in this mode, the same pitch control is utilized as in the Docking mode; however, full propeller pitch is reached when the propulsion lever has advanced approximately 25 percent of its full travel range.

In the Maneuvering mode of operation in prior art systems it was possible to encounter conditions which resulted in overtorque and therefore in danger of damage to elements of the system. For example, if a change in load caused the output shaft to become overloaded and the power setting and propeller pitch setting remained the same, substantial overtorquing could occur. In accordance with the present invention a gating means 79 is provided for reducing the fuel flow on a temporary basis in response to an indication of potential overtorque, until the condition which could have caused the overtorque has terminated.

In the gating means 79 the first signal representative of the predetermined power setting appears on line 76. A monitoring signal representative of the load speed or propeller speed appears on line 78. The signal appearing on line 78 is supplied to operational amplifier 80 which in turn provides a second signal proportional to the load speed or propeller speed which appears on line 77 and indicative of the maximum allowable power which can be called for at the monitored load speed. The gate 79 is a low value gate comprised of the diodes indicated as 81. The diodes 81 are poled as shown with respect to a common bus 82, from which a third signal, representative of the lower of the signals appearing on lines 76 and 77, is supplied to lines 83 and 75.

In actual operation of the gas turbine in the Maneuvering mode, if the first signal provided by the function generator 39 were fed directly into the power control amplifier 40, it would be possible to overtorque the mechanical transmission components of the system should the output shaft be overloaded for any reason and the propeller pitch be fixed as a constant. The purpose of the low value gate 79 is to compare the second signal, specifically, a maximum allowable power signal, on line 77 with the first signal (representative of the predetermined power setting) on line 76. When the second signal on line 77 is compared with the first signal on line 76, it can be determined whether the operating output torque will exceed an acceptable upper limit. The third signal, appearing on lines 83 and 75, is added to the existing minimum predetermined power signal and compared to the actual fuel flow represented on line 41. The operational amplifier 40 subsequently provides an additional fuel control signal resulting from the comparison between the summation of the signals on line 75 and 45 and the feedback signal appearing on line 41.

Figure 2:
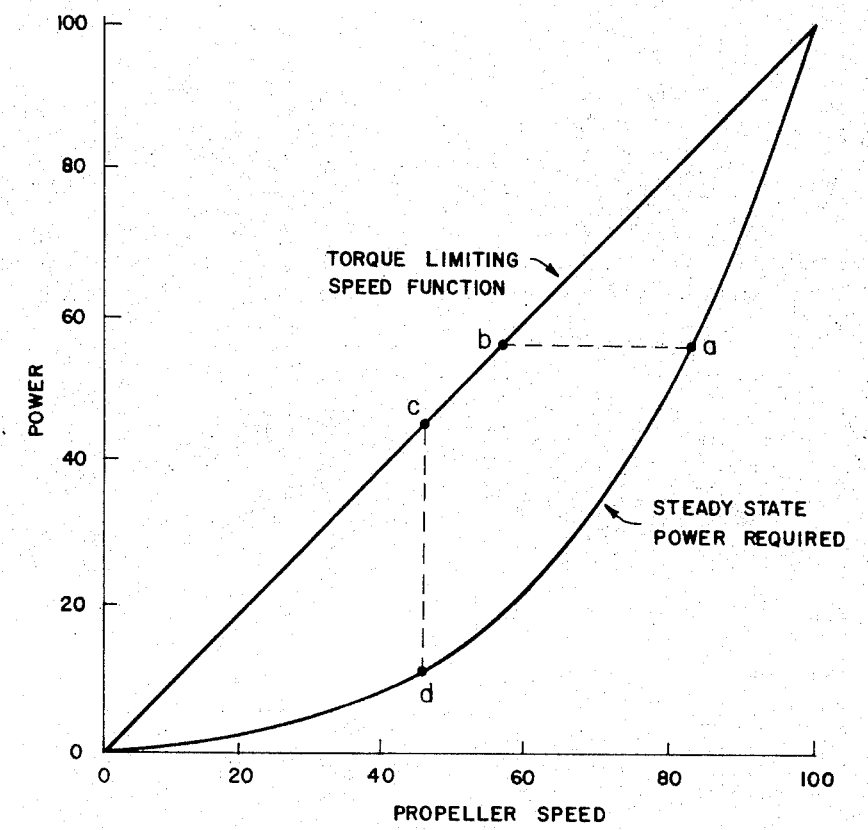
FIG. 2 illustrates the torque limiting aspects of the invention in relation to the power applied by the gas turbine and the resultant propeller speed.

As seen in FIG. 2 of the drawings, the upper limit of acceptable torque is applicable to the entire range of applied power and resultant propeller speeds. This results from the fact that the gas turbine output power is equal to the product of its load speed and output torque. Therefore, when the second signal on line 77 becomes less than the first signal on line 76, indicating that the maximum allowable power and necessarily the maximum allowable output torque would be exceeded if the predetermined power setting called for by the first signal is given effect, the low value gate 79 passes the lower, that is second, signal onto line 83 and the first signal is overridden until the load speed comes up to value allowing a further increase in the predetermined power setting to the gas turbine which will not cause the upper limit of acceptable torque to be exceeded. In FIG. 2 the above results are illustrated. A steady state operation point is shown at *a*. As the propeller speed decreases due to overloading at the constant power level *a*, point *b* is approached at which the upper limit of acceptable output torque is reached. Any further decrease in propeller speed causes the second signal to be lower than the first signal as described above and the operating point moves along the torque limiting line to *c*. As the propeller speed returns to steady state, the above path is retraced. It will be obvious to those skilled in the art that the above path and steady state power curve represent boundaries between which the transition from *c* to *a* may vary from straight line movements.

In a second situation shown in FIG. 2, an applied power setting level *d* is suddenly increased to level *a*. If the propeller speed does not increase as fast as the power developed by the gas turbine, it would be possible to exceed the upper limit of acceptable torque. As an example, if increased turbine power is applied at a propeller speed indicated at *d*, point *c* would be approached at which the upper limit of acceptable torque is reached. At point *c* the second signal becomes lower than the first signal thus preventing an increase in power which would result in the upper limit of acceptable torque being exceeded. As the propeller speed increases, the operating point moves along the torque limiting line to *b* which is at the same power level as point *a*. As the propeller speed continues to increase, the operating point moves along the line between *b* and *a*. It will be obvious to those skilled in the art that the above path and steady state power curve represent boundaries between which the transition from *d* to *a* may vary from straight line movements.

In the Sea mode of operation, the torque limiting aspect of gate 79 is not necessary, although it is available. The predetermined power signal developed by the function generator 39 is combined with the predetermined minimum power signal appearing on line 45 and the resultant summation is compared with the feedback signal appearing on line 41 which is representative of the actual fuel flow. In this third mode, a second pitch control is activated by a signal transmitted through lines 73 and 52. This second pitch control is in itself a torque limiting device. A signal representative of the load speed is fed into operational amplifier 65. The subsequent signal provided on lines 73 and 52 functions to maintain the load speed constant, at any predetermined power setting, by varying the pitch of the propeller through servo mechanism 54 in response to the signal applied to operational amplifier 53. Thus, in the Sea Mode, the gating means 79 functions as a torque limiting device in the event that the second pitch control becomes inoperative.

The additional fuel control signal supplied by operational amplifier 40 appears on line 31. When the additional fuel control signal is the lowest of all the several fuel control signals, it is passed by the low value gating means, represented by diodes 18, onto line 17 as a fourth signal. The fourth signal in turn passes through the fuel control 16 to the fuel pump 15. Thus, when conditions are present which could overtorque the output components, the fourth signal reduces the fuel flow to the combustion chamber of the gas turbine thereby precluding any overtorque from being developed.

While there is shown one embodiment of the invention, it is of course understood that various modifications may be made therein, and it is intended to cover in the appended claims all such modifications as fall within the true spirit and scope of the invention.

What is claimed as new and desired to be secured by Letters Patent of the United States is:

1. In a control system for a gas turbine driving a load at a given speed including a fuel supply means and servo means to control fuel flow through said fuel supply means to a combustion chamber of the gas turbine in accordance with a lowest value gated fuel control signal developed by a plurality of loop control means, each continuously responsive to a different operating parameter of the gas turbine and each arranged to supply a respective fuel control signal to a low value gating means; the combination comprising:

means for providing a predetermined power setting signal;

means for developing a maximum allowable power signal proportional to the load speed; and an additional loop control means supplying an additional fuel signal to said low value gating means, said additional fuel control signal being representative of the lower of a comparison of said predetermined power setting signal and said maximum allowable power signal, whereby load shaft torque is limited by said additional fuel control signal when it is dependent on the load speed.

2. A control system for a gas turbine, wherein the gas turbine includes servo means for controlling fuel flow to a combustion chamber of the gas turbine in accordance with a lowest value gated fuel control signal developed by a plurality of loop control means, each responsive to a different operating parameter of the gas turbine and each arranged to supply a respective fuel control signal to a low value gating means; comprising:

an additional loop control means for supplying an additional fuel control signal to said low value gating means, said additional loop control means comprising:

means for providing a minimum power signal;

means for providing a first signal representative of a predetermined power setting;

means for developing a second signal proportional to the value of the load speed and indicative of maximum allowable power;

means for developing a feedback signal indicative of actual fuel flow;

second gating means for comparing said first signal and said second signal, said second gating means providing a third signal representative of the lower of said first and second signal; and summing means for combining said minimum power signal, said third signal and said feedback signal to provide said additional fuel control signal.

* * * * *